United States Patent
Raynel (10) Patent No.: US 11,542,184 B2
(45) Date of Patent: Jan. 3, 2023

(54) PROCESSES AND SYSTEMS FOR TREATING SOUR WATER

(71) Applicant: Saudi Arabian Oil Company, Dhahran (SA)

(72) Inventor: Guillaume Robert Jean-Francois Raynel, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 244 days.

(21) Appl. No.: 16/701,332

(22) Filed: Dec. 3, 2019

(65) Prior Publication Data

US 2021/0163322 A1 Jun. 3, 2021

(51) Int. Cl.
| | |
|---|---|
| *C02F 1/52* | (2006.01) |
| *C02F 1/461* | (2006.01) |
| *C25B 1/26* | (2006.01) |
| *C02F 101/10* | (2006.01) |
| *C02F 101/20* | (2006.01) |

(52) U.S. Cl.
CPC ........ *C02F 1/5236* (2013.01); *C02F 1/46109* (2013.01); *C02F 1/5281* (2013.01); *C25B 1/26* (2013.01); *C02F 2001/5218* (2013.01); *C02F 2101/101* (2013.01); *C02F 2101/20* (2013.01)

(58) Field of Classification Search
CPC .................................................. C02F 1/5236
See application file for complete search history.

(56) References Cited

U.S. PATENT DOCUMENTS

| | | | |
|---|---|---|---|
| 3,847,764 | A | 11/1974 | Schievelbein et al. |
| 5,246,597 | A | 9/1993 | Jenson et al. |
| 2006/0254930 | A1 | 11/2006 | Martinie et al. |

(Continued)

FOREIGN PATENT DOCUMENTS

| | | |
|---|---|---|
| CN | 205133217 U | 4/2016 |
| CN | 107758941 A | 3/2018 |
| GB | 1374010 | 11/1974 |

OTHER PUBLICATIONS

Waterston et al., Electrochemical oxidation of sulfide ion at a boron-doped diamond anode, Journal of Applied Electrochemistry 37.3 (2007); 367-373; 2007.*

(Continued)

*Primary Examiner* — Peter Keyworth
(74) *Attorney, Agent, or Firm* — Dinsmore & Shohl, LLP (57) ABSTRACT

Processes for producing olefins may include electrolyzing an aqueous solution comprising metal chloride, where electrolyzing the aqueous solution causes at least a portion of the metal chloride to undergo chemical reaction to produce a treatment composition comprising hypochlorite. The processes may further include contacting at least a portion of the treatment composition with the sour water at a pH from 8 to 12, where the sour water comprises sulfides and the contacting causes reaction of the sulfides in the sour water with the hypochlorite to produce a treated aqueous mixture comprising at least metal sulfates and metal chlorides, where the metal sulfates are present in the treated aqueous mixture as precipitated solids. The processes may further include separating the precipitated solids from the treated aqueous mixture to produce a treated effluent comprising at least the metal chloride.

18 Claims, 1 Drawing Sheet

(56) References Cited

U.S. PATENT DOCUMENTS

| | | | |
|---|---|---|---|
| 2011/0281318 A1* | 11/2011 | Schreuder | B01D 53/52 435/168 |
| 2014/0045248 A1* | 2/2014 | Wallace | C02F 11/004 435/262 |
| 2018/0230026 A1 | 8/2018 | Raynel et al. | |

OTHER PUBLICATIONS

Kramer et al. "Selection and Design of Industrial Crystallizers" https://www.cambridge.org/core, 2019, 19 pgs.

International Search Report and Written Opinion dated Jul. 8, 2020 pertaining to International application No. PCT/US2020/024874 filed Mar. 26, 2020, 13 pgs.

\* cited by examiner

PROCESSES AND SYSTEMS FOR TREATING SOUR WATER

BACKGROUND

Field

The present disclosure generally relates to processes and systems for treating sour water, in particular, processes and systems for treating sour water to remove sulfides and other contaminants to produce treated water.

Technical Background

Petroleum production and refining operations may produce various aqueous streams, such as sour water, for example, that contain organic and inorganic compounds. These organic and inorganic compounds may include compounds, such as ammonium sulfide, hydrogen sulfide, phenolic compounds, and hydrogen cyanide. In order to comply with relevant environment regulations, these organic and inorganic compounds must be removed from these aqueous streams before reuse or discharge to municipal water treatment systems. Various water treatment processes and systems are available for removing these organic and inorganic compounds from aqueous streams produced from hydrocarbon drilling, production, or processing operations. However, conventional treatment processes and systems may not be suitable for reliably removing the organic and inorganic compounds below the mandatory levels before discharge or reuse, thereby necessitating the use of additional resources to ensure compliance with relevant regulations.

SUMMARY

During hydrocarbon production and processing operations, such as hydrocarbon refining processes, various aqueous streams may be produced, such as aqueous streams from atmospheric and vacuum crude columns or produced water from hydrocarbon production. These aqueous streams may be contaminated by organic and inorganic compounds, which must be removed from the water to meet the environmental regulations before reuse or discharge to municipal treatment systems. Typical contaminants in these aqueous streams may include, but are not limited to, sulfides such as ammonium sulfide and hydrogen sulfide, phenolic compounds, and hydrogen cyanide. These aqueous streams comprising sulfides such as hydrogen sulfide, ammonium sulfide, or both, may be referred to as "sour water." As used throughout the present disclosure, the term "sour water" may refer to an aqueous stream, effluent, or composition having greater than or equal to 100 parts per million by weight (ppmw) sulfur.

Conventional treatment processes for removing sulfides and other contaminants from these aqueous streams (sour water) may include sour water stripping processes. In a typical sour water stripper, the sour water is sent to a stripping tower where heat, in the form of steam, is applied to the sour water. Once the heat is applied to the sour water the ammonia and hydrogen sulfide are released and exit from the top of the tower as a gaseous stream. However, when conventional sour water strippers are used, other contaminants, such as phenolic compounds and hydrogen cyanide, may remain in the liquid phase. To reduce the remaining phenolic and hydrogen cyanide contaminants to suitable levels, additional steps must be implemented, such as introducing the liquid phase that includes phenolic compounds and hydrogen cyanide to a reboiler. Therefore, treatment of sour water using conventional sour water stripping processes may require additional machinery or processes, thereby reducing the efficiency of the treatment process.

Therefore, ongoing needs exist for systems and processes for treating sour water, in particular, systems and processes that are more efficient in removing all contaminants without the addition of downstream treatment systems. The sour water treatment systems and processes of the present disclosure may include treating the sour water with a treatment solution comprising hypochlorite under basic pH conditions to convert sulfides in the sour water to insoluble sulfates, which can then be filtered out of the treated aqueous effluent. The treatment solution may include preparing a solution of a metal chloride in water and electrolyzing the metal chloride solution to convert the metal chlorides to hypochlorites. Metal hydroxide may be added to maintain the basic pH. The metal of the metal chlorides and metal hydroxides may include barium, strontium, or a combination of both, which may form the insoluble metal sulfates during the treatment. Other contaminants, such as the phenolic compounds, hydrogen cyanide, or both, may be further converted to less toxic compounds, such as carbon dioxide, nitrogen gas, metal carbonates, water, or combinations of these. Thus, the treatment systems and processes of the present disclosure may reduce the concentrations of sulfides as well as phenolic compounds and hydrogen cyanides. At least a portion of the metal chlorides and metal hydroxides may be recovered and recycled back to make the metal chloride solution.

According to one or more embodiments of the present disclosure, a process for treating sour water may include electrolyzing an aqueous solution comprising metal chloride, where electrolyzing the aqueous solution causes at least a portion of the metal chloride to undergo a chemical reaction to produce a treatment composition comprising hypochlorite. The process may further include contacting at least a portion of the treatment composition with the sour water at a pH from 8 to 12, where the sour water comprises sulfides and the contacting causes reaction of the sulfides in the sour water with the hypochlorite to produce a treated aqueous mixture comprising at least metal sulfates and metal chlorides, where the metal sulfates are present in the treated aqueous mixture as precipitated solids. The process may also include separating the precipitated solids from the treated aqueous mixture to produce a treated effluent comprising at least the metal chloride.

According to one or more additional embodiments of the present disclosure, a process for treating sour water may include passing an electric current through an aqueous solution in an electrolyzer to produce a treatment composition, where the aqueous solution comprises metal chloride and metal hydroxide and passing the electric current through the aqueous solution causes at least a portion of ions present in the metal chloride to react to form hypochlorite. The process may additionally include passing the sour water and at least a portion of the treatment composition comprising the hypochlorite to a reaction zone. The process may further include contacting the at least a portion of the treatment composition with the sour water in the reaction zone, where the sour water comprises sulfides and the contacting causes reaction of at least a portion of the sulfides in the sour water with the hypochlorite to produce a treated aqueous mixture comprising at least metal sulfates and metal chlorides, where the metal sulfates are present in the treated aqueous mixture as precipitated solids. The process may also include passing the treated aqueous mixture to a separation device. The process moreover may include separating the treated aqueous effluent into at least a solid stream comprising the precipitated solids and a treated effluent comprising at least metal chlorides and metal hydroxides.

According to one or more additional embodiments of the present disclosure, a system for treating sour water may include an electrolyzer comprising at least one anode, at least one cathode, and a power source electrically coupled to the at least one anode and the at least one cathode, the electrolyzer operable to pass an electric current through an aqueous solution comprising metal chloride to produce a treatment composition comprising hypochlorite. The system may further include a reactor downstream from the electrolyzer, where the reactor may be operable to contact at least a portion of the treatment composition comprising the hypochlorite with sour water at a pH from 8 to 12. The system may also include a separation device downstream from the reactor, where the separation device may be operable to separate precipitated solids from the treated aqueous mixture to produce a solid product comprising the precipitated solids and a treated effluent comprising the metal chloride.

Additional features and advantages of the described embodiments will be set forth in the detailed description that follows, and in part will be readily apparent to those skilled in the art from the description or recognized by practicing the described embodiments, including the detailed description that follows, the claims, as well as the appended drawings.

BRIEF DESCRIPTION OF THE DRAWING

The following detailed description of specific embodiments of the present disclosure can be best understood when read in conjunction with the following drawing, where like structure is indicated with like reference numerals and in which.

Figure 1:
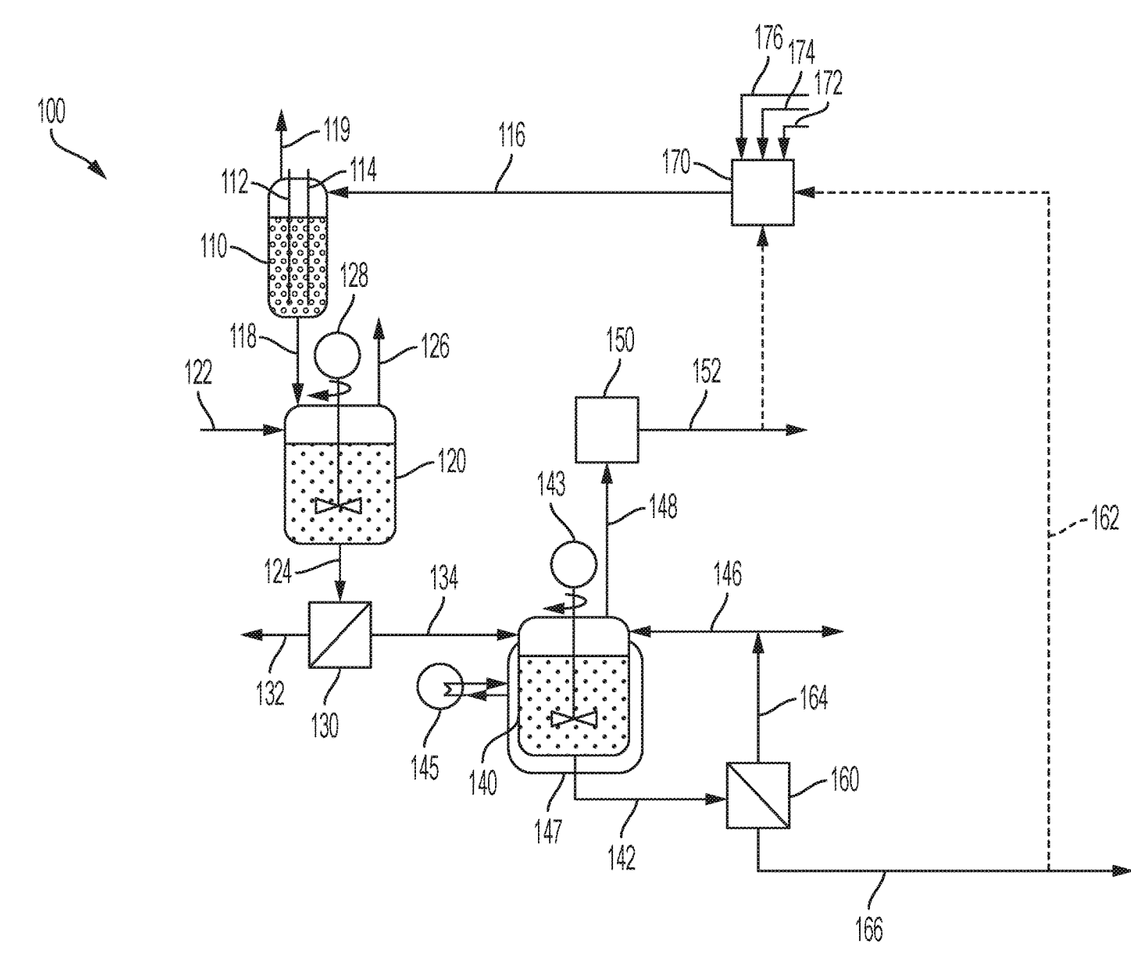
FIG. 1 schematically depicts a sour water treatment system, according to one or more embodiments of the present disclosure.

For the purpose of describing the simplified schematic illustrations and descriptions of FIG. 1, the numerous valves, temperature sensors, electronic controllers, and the like that may be employed and well known to those of ordinary skill in the art of certain chemical processing operations are not included. Further, accompanying components that are often included in typical chemical processing operations, gas supply systems, electrical system, pumps, compressors, agitation systems, mixers, or other subsystems may not be depicted. It should be understood that these components are within the spirit and scope of the present embodiments disclosed. However, operational components, such as those described in the present disclosure, may be added to the embodiments described in this disclosure.

Arrows in the drawings refer to process streams. However, the arrows may equivalently refer to transfer lines, which may serve to transfer process streams between two or more system components. Additionally, arrows that connect to system components may define inlets or outlets in each given system component. The arrow direction corresponds generally with the major direction of movement of the materials of the stream contained within the physical transfer line signified by the arrow. Furthermore, arrows that do not connect two or more system components may signify a product stream, which exits the depicted system, or a system inlet stream, which enters the depicted system. Product streams may be further processed in accompanying chemical processing systems or may be commercialized as end products.

Additionally, arrows in the drawings may schematically depict process steps of transporting a stream from one system component to another system component. For example, an arrow from one system component pointing to another system component may represent "passing" a system component effluent to another system component, which may include the contents of a process stream "exiting" or being "removed" from one system component and "introducing" the contents of that product stream to another system component.

It should be understood that two or more process streams are "mixed" or "combined" when two or more lines intersect in the schematic flow diagrams of FIG. 1. Mixing or combining may also include mixing by directly introducing both streams into a like system component, such as a vessel, reactor, separator, or other system component. For example, it should be understood that when two streams are depicted as being combined directly prior to entering a system component, the streams could equivalently be introduced into the system component and be mixed in the system component.

Reference will now be made in greater detail to various embodiments, some embodiments of which are illustrated in the accompanying drawings.

DETAILED DESCRIPTION

Processes and systems are disclosed for treating sour water. Referring to FIG. 1, one embodiment of a sour water treatment system 100 for performing a sour water treatment process is depicted. The sour water treatment system 100 may include an electrolyzer 110, a reactor 120 downstream of the electrolyzer 110, and a separation device 130 downstream of the reactor 120. The sour water treatment process may be performed using the sour water treatment system 100 to remove organic and inorganic compounds from sour water or other aqueous streams. The sour water treatment process may include electrolyzing an aqueous solution 116 comprising metal chloride or metal chloride and metal hydroxide, where electrolyzing the aqueous solution 116 may cause at least a portion of the metal chloride or the metal chloride and the metal hydroxide to undergo a chemical reaction to produce a treatment composition 118 comprising hypochlorite. The sour water treatment process may further include contacting at least a portion of the treatment composition 118 with the sour water 122 at a pH of from 8 to 12, where the sour water 122 may include sulfides and the contacting may cause reaction of the sulfides in the sour water 122 with the hypochlorite to produce a treated aqueous mixture 124. The treated aqueous mixture 124 may include at least metal sulfates and metal chlorides, where the metal sulfates are present in the treated aqueous mixture as precipitated solids. The treated aqueous mixture 124 may also include metal carbonates, metal hydroxides, or both, where the metal carbonates may be present in the precipitated solids and the metal hydroxides may be dissolved in the liquid. The sour water treatment process may also include separating the precipitated solids 132 from the treated aqueous mixture 124 to produce a treated effluent 134 that includes at least the metal chloride.

The sour water treatment process may remove organic and inorganic compounds, such as ammonium sulfide, hydrogen sulfide, phenolic compounds, and hydrogen cyanide, from the sour water 122, thereby producing a treated effluent 134, which may include at least metal chlorides, metal hydroxides, or both. The hypochlorite in the treatment composite on 118 may react with the organic and inorganic compounds to break down these compounds into less toxic compounds, thereby, reducing the concentrations of these organic and inorganic compounds to acceptable levels. By performing sour water treatment with such systems and processes, lesser components, such as a reboiler, may not be needed to fully treat the sour water, when compared to conventional treatment processes. Moreover, some of the solids produced during the process, such as metal sulfates, metal carbonates, or both, may be recovered for use in other industrial purposes.

As used throughout the present disclosure, the term "phenolic compounds" refers to any compound that includes a hydroxyl group (—OH) directly bonded to an aromatic hydrocarbon group.

As used in this disclosure, a "reactor" refers to any vessel, container, or the like, in which one or more chemical reactions may occur between one or more reactants optionally in the presence of one or more catalysts. For example, a reactor may include a tank or tubular reactor configured to operate as a batch reactor, a continuous stirred-tank reactor (CSTR), or a plug flow reactor. Example reactors include packed bed reactors such as fixed bed reactors, and fluidized bed reactors. One or more "reaction zones" may be disposed within a reactor. As used in this disclosure, a "reaction zone" refers to an area where a particular reaction takes place in a reactor.

As used in this disclosure, a "separation unit" refers to any separation device that at least partially separates one or more chemicals in a mixture from one another. For example, a separation unit may selectively separate different chemical species from one another, forming one or more chemical fractions. Examples of separation units include, without limitation, distillation columns, fractionators, flash drums, knock-out drums, knock-out pots, centrifuges, filtration devices, traps, scrubbers, expansion devices, membranes, solvent extraction devices, high-pressure separators, low-pressure separators, and the like. It should be understood that separation processes described in this disclosure may not completely separate all of one chemical consistent from all of another chemical constituent. It should be understood that the separation processes described in this disclosure "at least partially" separate different chemical components from one another, and that even if not explicitly stated, it should be understood that separation may include only partial separation. As used in this disclosure, one or more chemical constituents may be "separated" from a process stream to form a new process stream. Generally, a process stream may enter a separation unit and be divided or separated into two or more process streams of desired composition.

As used in this disclosure, the term "effluent" may refer to a stream that is passed out of a reactor, a reaction zone, or a separation unit following a particular reaction or separation. Generally, an effluent has a different composition than the stream that entered the separation unit, reactor, or reaction zone. It should be understood that when an effluent is passed to another system unit, only a portion of that system stream may be passed. For example, a slipstream may carry some of the effluent away, meaning that only a portion of the effluent may enter the downstream system unit. The term "reaction effluent" may more particularly be used to refer to a stream that is passed out of a reactor or reaction zone.

As used throughout the present disclosure, the terms "upstream" and "downstream" refer to the positioning of components or units of the system 100 relative to a direction of flow of materials through the system 100. For example, a first component may be considered "upstream" of a second component if materials flowing through the system 100 encounter the first component before encountering the second component. Likewise, the second component is considered "downstream" of the first component if the materials flowing through the system 100 encounter the first component before encountering the second component.

As used in the present disclosure, reciting that a stream is passed "directly" from an upstream component to a downstream component may refer to passing the stream from the upstream component to the downstream component without passing the stream through an intervening unit operation operable to change the composition or characteristics of the stream. Intervening unit operations can include reactors and separation units but are not generally intended to include heat exchangers, valves, pumps, sensors, or other ancillary process equipment required for operation of a chemical process.

Referring again to FIG. 1, the sour water treatment system 100 may include an electrolyzer 110, a reactor 120 downstream of the electrolyzer 110, and a separation device 130 downstream of the reactor 120. The sour water treatment system 100 may further include an aqueous solution preparation system 170 upstream of the electrolyzer 110. The sour water treatment system 100 may further include a vacuum crystallization system 140 downstream of the separation device 130. The sour water treatment system 100 may be used to remove one or more contaminant compounds, such as sulfides, phenolic compounds, hydrogen cyanides, or combinations of these from the sour water.

Referring to FIG. 1, the aqueous solution preparation system 170 may be operable to prepare the aqueous solution 116. The aqueous solution preparation system 170 may be operable to receive metal chloride 172, metal hydroxide 174, and water 176 and combine the metal chloride 172, metal hydroxide 174, and water to produce the aqueous solution 116. The aqueous solution preparation system 170 may also be operable to receive recycled metal chloride, recycled metal hydroxide, or both from recycle line 162. The recycled metal chloride, recycled metal hydroxide, or both may provide at least a portion of the metal chloride and metal hydroxide, respectively, in the aqueous solution 116. The aqueous solution preparation system 170 may also be operable to receive water 152 recovered from the system 100, the water 152 providing at least a portion of the water in the aqueous solution 116.

The metal of the metal chloride 172, metal hydroxide 174, or both may be barium, strontium, or both. Regardless of whether the aqueous solution includes metal chloride or both metal chloride and metal hydroxide, the metal of the metal chloride, metal hydroxide, or both may include strontium, barium, or both. During experimentation, it was discovered that strontium and barium have suitable solubility characteristics regardless of whether they are present in the chloride form, hydroxide form, carbonate form, or sulfate form. Moreover, most barium salts and all strontium salts are non-toxic. In contrast, it was discovered that lead is not suitable for inclusion in sour water treatment processes because it has highly toxic characteristics, which render it unfit for inclusion in the process. Additionally, under the reaction conditions, the lead (II) chloride may react to form lead (IV) oxide rather than lead (II) hypochlorite. Likewise, radium is not suitable for sour water treatment processes because it is radioactive, and therefore highly toxic. It was also found that calcium is not suitable for inclusion in sour water treatment processes because of its poor solubility, especially in its hydroxide form. Finally, it was found that sodium and potassium are not suitable for inclusion in sour water treatment processes because of their poor solubility, especially in their chloride forms.

The aqueous solution 116 may include an amount of metal chloride sufficient to produce a concentration of hypochlorite in the treatment composition 118 capable of treating the sour water 122. The aqueous solution 116 may include from 15 percent by weight (wt. %) to 30 wt. % metal chloride based on the total mass flow rate of the aqueous solution 116. In embodiments, the aqueous solution 116 may include from 17.5 wt. % to 30 wt. %, from 20 wt. % to 30 wt. %, from 22.5 wt. % to 30 wt. %, from 25 wt. % to 30 wt. % metal chloride based on the total mass flow rate of the aqueous solution 116. The concentration of the metal chloride may be increased or decreased based on the composition of the sour water 122. The aqueous solution 116 may include an amount of metal hydroxide sufficient to maintain the pH in the electrolyzer 110 and the reactor 120 in a range of from 8 to 12. The aqueous solution may include from 1 wt. % to 10 wt. % metal hydroxide based on the total mass flow rate of the aqueous solution 116. In embodiments, the aqueous solution 116 may include from 1.5 wt. % to 9.5 wt. %, from 2 wt. % to 8 wt. %, from 2.5 wt. % to 7.5, from 3 wt. % to 7 wt. %, from 3.5 wt. % to 6.5 wt. %, from 4 wt. % to 6 wt. %, from 4.5 wt. % to 5.5 wt. %, or 5 wt. % metal hydroxide based on the total mass flow rate of the aqueous solution 116. The balance of the aqueous solution 116 may be water. The pH in the electrolyzer 110, the reactor 120, or both may be increased or decreased by increasing or decreasing a concentration of the metal hydroxide in the aqueous solution 116. In embodiments, the aqueous solution 116 may include 27 wt. % metal chloride, 68 wt. % water, and 5 wt. % metal hydroxide based on the total mass flow rate of the aqueous solution 116. In one or more embodiments, the aqueous solution 116 may include 28 wt. % metal chloride, 69.5 wt. % water, and 2.5 wt. % metal hydroxide based on the total mass flow rate of the aqueous solution 116.

Referring again to FIG. 1, the aqueous solution 116 may be passed to the electrolyzer 110. The electrolyzer 110 may include a vessel comprising a plurality of electrodes, such as at least one anode 112 and at least one cathode 114. In embodiments, the electrolyzer 110 may include a plurality of anodes 112 and a plurality of cathodes 114, which may be distributed throughout the electrolyzer 110. The electrolyzer 110 may further include a power source (not shown) that may be electrically coupled to the plurality of electrodes (such as at least one anode 112 and the at least one cathode 114). Although the system 100 is depicted in FIG. 1 as having a single electrolyzer 110, it is understood that the system 100 may include a plurality of electrolyzers 110, which may be arranged and operated in parallel or in series.

The electrolyzer 110 may be operable to pass an electric current through the aqueous solution 116 comprising the metal chloride, the metal hydroxide, or both to produce the treatment composition 118 including hypochlorite. Under basic conditions of pH from 8 to 12, passing the electric current through the aqueous solution 116 may cause at least a portion of the ions present in the metal chlorides to react to form at least hypochlorite and water to react to form hydrogen gas. The hydrogen gas may be passed out of the electrolyzer 110 as hydrogen stream 119. The hydrogen gas may be formed at the electrodes and bubbles of the hydrogen gas may provide at least some mixing within the electrolyzer 110. In embodiments, the electrolyzer 110 may include an agitator or mixer (not shown), which may provide mixing during electrolysis of the aqueous solution 116.

The process for treating sour water with the system 100 may include electrolyzing the aqueous solution 116 including at least the metal chloride, where electrolyzing the aqueous solution 116 causes at least a portion of the metal chloride to undergo a chemical reaction to produce the treatment composition 118 that includes hypochlorite. The aqueous solution 116 may further include the metal hydroxide. The metal hydroxide may be operable to maintain the pH in the electrolyzer 110, the reactor 120, or both, in a range of from 8 to 12. The process for treating sour water with the system 100 may further include preparing the aqueous solution 116. In embodiments, the electrolyzing process may include passing an electric current through the aqueous solution 116 in the electrolyzer 110 to produce the treatment composition 118. The electrolyzer 118 may include a vessel, at least one anode, and at least one cathode. When the aqueous solution 116 includes both the metal chloride and the metal hydroxide, the treatment composition 118 may be prepared by contacting the metal chloride with the at least one anode, such that the contacting causes at least a portion of ions present in the metal chloride to react to form hypochlorite, and contacting water with the at least one cathode, such that the contacting causes at least a portion of the water to react to form hydrogen.

Referring again to FIG. 1, the treatment composition 118 may be passed from the electrolyzer 110 to the reactor 120. The electrolyzer 110 may be fluidly coupled to the reactor 120, such that at least a portion of the treatment composition 118 may be introduced to the reactor 120. Likewise, a stream of sour water 122 may be introduced to the reactor 120 before, during, or after passing the treatment composition 118 to the reactor 120. The reactor 120 may be any type of reactor capable of contacting the treatment composition 118 with the sour water 122. For example, the reactor 120 may include a tank or tubular reactor configured to operate as a batch reactor, a continuous stirred-tank reactor (CSTR), or a plug flow reactor. In embodiments, the reactor 120 may be a continuous stirred-tank reactor, which may be operated continuously or batchwise. The reactor 120 may include one or a plurality of separate reactors. In embodiments, the reactor 120 may include a plurality of reactors, which may be operated in series or in parallel.

A previously discussed, the sour water 122 may be sulfide-containing water produced during hydrocarbon production, hydrocarbon processing, or both. For example, the sour water 122 may be an aqueous stream recovered from an atmospheric or vacuum crude column. The sour water 122 may include sulfides, such as but not limited to hydrogen sulfide and ammonium sulfide. The sour water 122 may include from 100 parts per million by weight (ppmw) to 100,000 ppmw hydrogen sulfide based on the total mass flow rate of the sour water 122. The sour water 122 may include from 100 ppmw to 100,000 ppmw ammonium sulfide based on the total mass flow rate of the sour water 122. The sour water may also include organic contaminants, such as phenolic compounds, hydrogen cyanide or both. The sour water 122 may include from 50 ppmw to 500 ppmw phenolic compounds based on the total mass flow rate of the sour water 122. The sour water 122 may include from 300 ppmw to 500 ppmw hydrogen cyanide based on the total mass flow rate of the sour water 122.

At least a portion of the treatment composition 118 may be contacted with the sour water 122 in the reactor 120. Contacting the treatment composition 118 with the sour water 122 may cause reaction of at least a portion of the sulfides in the sour water 122 with the hypochlorite in the treatment composition 118 to produce a treated aqueous mixture 124. The reactor 120 may optionally include a mixer 128 to increase the amount of contact between the treatment composition 118 and the sour water 122. Reaction of the hypochlorite with constituents of the sour water 122 may produce one or more gases, such as but not limited to nitrogen, which may be passed out of the reactor 120 through gas stream 126.

The reactor 120 may be operated at a temperature and pressure typical in hydrocarbon processing facilities. The reactor 120 may be operated at a temperature from 15 degrees Celsius (° C.) to 45° C., such as from 17.5° C. to 40° C., from 20° C. to 35° C., from 22.5° C. to 30° C., from 22.5° C. to 25° C., or 23° C. The reactor 120 may be operated at a pressure from 50 kilopascals (kPa) to 200 kPa, such as from 60 kPa to 175 kPa, from 70 kPa to 150 kPa, from 75 kPa to 125 kPa, from 80 kPa to 120 kPa, from 90 kPa to 110 kPa, or 100 kPa. The reactor 120 may be operated in a pH range that promotes reaction of sulfides with the hypochlorite to produce metal sulfates. The reactor 120 may be operated at a pH of greater than or equal to 8, greater than or equal to 9, or even greater than or equal to 10. In one or more embodiments, reactor 120 may be operated at a pH from 8 to 12, from 8 to 11, from 8 to 10, from 9 to 12, from 9 to 11, from 9 to 10, from 10 to 12, from 10 to 11, or from 11 to 12.

The volume flow rate of the sour water 122 introduced to the reactor 120 may be from 1 cubic meter per hour (m$^3$/hr) to 50 m$^3$/hr, such as from 5 m$^3$/hr to 45 m$^3$/hr, from 10 m$^3$/hr to 40 m$^3$/hr, from 15 m$^3$/hr to 35 m$^3$/hr, or from 20 m$^3$/hr to 30 m$^3$/hr. If the flow rate of the sour water 122 exceeds 10 m$^3$/hr, multiple components, such as additional electrolyzers 110, reactors 120, or separation devices 130 may be included in the sour water treatment system 100 to treat the sour water 122. The volumetric ratio of the treatment composition 118 to the sour water 122 in the reactor 120 may be sufficient to reduce the concentration of at least sulfides in the sour water 122 to concentrations below regulatory limits. The volumetric ratio between the treatment composition 118 and the sour water 122 introduced to the reactor 120 may be from 0.5 to 1.8, such as from 0.5 to 1.7, from 0.5 to 1.6, from 0.5 to 1.5, from 0.5 to 1.4, from 0.5 to 1.3, from 0.5 to 1.2, from 0.5 to 1.1, from 0.5 to 1.0, from 0.5 to 0.9, from 0.5 to 0.8, or from 0.5 to 0.7.

As previously discussed, the process for treating the sour water 122 may further include contacting at least a portion of the treatment composition 118 with the sour water 122 at a basic pH. The pH during the contacting step may be basic to ensure that the contacting causes reaction of the sulfides in the sour water with the hypochlorite to produce the treated aqueous mixture 124 that comprises at least metal sulfates that are insoluble and metal chlorides that are soluble. In embodiments, the pH during the contacting step may be greater than or equal to 8, greater than or equal to 9, or even greater than or equal to 10. The pH during the contacting step may be from 8 to 12, from 8 to 11, from 8 to 10, from 9 to 12, from 9 to 11, from 9 to 10, from 10 to 12, from 10 to 11, or from 11 to 12.

The contacting step may be performed at temperatures and pressures suitable to cause reactions of the sulfides in the sour water with the hypochlorite to produce the treated aqueous mixture. In embodiments, the temperature during the contacting step may be from 15 degrees Celsius (° C.) to 45° C., such as from 17.5° C. to 40° C., from 20° C. to 35° C., from 22.5° C. to 30° C., from 22.5° C. to 25° C., or 23° C. The pressure during the contacting step may be from 50 kilopascals (kPa) to 200 kPa, such as from 60 kPa to 175 kPa, from 70 kPa to 150 kPa, from 75 kPa to 125 kPa, from 80 kPa to 120 kPa, or from 90 kPa to 110 kPa.

In one or more embodiments, the sour water comprises hydrogen cyanide. In such embodiments, during the contacting step, contacting the at least a portion of the treatment composition with the sour water may cause reactions between the hydrogen cyanide, the hypochlorite, and water. These reactions may produce at least metal chlorides, nitrogen gas, and metal carbonates, where at least a portion of the metal carbonates may be present in the treated aqueous mixture as a portion of the precipitated solids.

In embodiments in which the sour water includes phenolic compounds, during the contacting step, contacting the at least a portion of the treatment composition with the sour water may cause reactions between the phenolic compounds and the hypochlorite to produce at least metal chlorides, metal carbonates, and water. In such embodiments, at least a portion of the metal carbonates may be present in the treated aqueous effluent as a portion of the precipitated solids.

In embodiments, hydrogen sulfide, ammonium sulfide, phenolic compounds, and hydrogen cyanide may all be present in the sour water. In such embodiments, the following reactions may occur during the contacting step:

$$HCN + OH^- \rightleftharpoons CN^- + H_2O \qquad \text{(Equation 1)}$$

$$4OCl^- + SH^- + OH^- \rightleftharpoons SO_4^{2-} + 4Cl^- + H_2O \qquad \text{(Equation 2)}$$

$$14OCl^- + C_6H_6O \rightleftharpoons 6CO_2 + 14Cl^- + 3H_2O \qquad \text{(Equation 3)}$$

$$5OCl^- + H_2O + 2CN^- \rightleftharpoons 2CO_2 + 5Cl^- + 2OH^- + N_2 \qquad \text{(Equation 4)}$$

$$CO_2 + 2OH^- \rightleftharpoons CO_3^{2-} + H_2O \qquad \text{(Equation 5)}$$

In this series of reactions, Equation 1 shows an acid-base reaction between hydrogen cyanide (HCN) and hydroxide ions to produce cyanide ions (CN$^-$) and water (H$_2$O). Subsequently, a series of oxidation-reduction reactions in Equations 2-4 occurs to produce sulfate ions (SO$_4^{2-}$), chloride ions (Cl$^-$), hydroxide ions (OH$^-$), nitrogen (N$_2$), and carbon dioxide (CO$_2$). The carbon dioxide then reacts with hydroxide ions in Equation 5 to produce carbonate ions (CO$_3^{2-}$). The sulfate ions and the carbonate ions may then react with metal that was initially present in the metal chloride to produce metal sulfate, metal carbonate, or both as precipitated solids. The precipitated solids may then be separated from the treated aqueous mixture 124 to produce a treated effluent 134.

In embodiments, the chloride ions formed during Equations 2-4 may also react with the metal introduced during the electrolyzing step to again form metal chloride, which may be present in the treated effluent 134. The chloride ions may also react with the ammonium ions from the ammonium sulfide to convert the ammonium ions to ammonium chloride.

The process for treating the sour water 122 may be at least 99% efficient, such as 99.1% efficient, 99.2% efficient, 99.3% efficient, 99.4% efficient, 99.5% efficient, 99.6% efficient, 99.7% efficient, 99.8% efficient, 99.9% efficient, or 99.99% efficient in removing the hydrogen sulfide, the ammonium sulfide, the phenolic compounds, and the hydrogen cyanide from the sour water 122. As such, depending on the concentrations of the hydrogen sulfide, ammonium sulfide, phenolic compounds, and hydrogen cyanide initially present in the sour water 122, the treated aqueous mixture 124 may include less than 10 ppmw of hydrogen sulfide, less than 10 ppmw of ammonium sulfide, less than 0.05 ppmw of phenol, and less than 0.05 ppmw of hydrogen cyanide based on the total weight of the treated aqueous mixture 124. In embodiments, the treated aqueous mixture 124 may include less than 1 ppmw of hydrogen sulfide, less than 1 ppmw of ammonium sulfide, less than 0.005 ppmw of phenol, and less than 0.005 ppmw of hydrogen cyanide.

The metal sulfates produced in the reactor 120 may be present in the treated aqueous mixture 124 as precipitated solids. The metal sulfates in the treated aqueous mixture 124 may include strontium sulfate, barium sulfate, or both strontium sulfate and barium sulfate. The liquid portion of the treated aqueous mixture 124 may include water, metal chlorides, metal hydroxides, ammonium chloride, and any other water-soluble constituents. The metal chlorides may include barium chloride, strontium chloride, or both, which may be soluble in water. The metal hydroxides may include barium hydroxide, strontium hydroxide, or both, which may also be soluble in water. The treated aqueous mixture 124 may be passed out of the reactor 120.

Referring again to FIG. 1, the reactor 120 may be fluidly coupled to the separation device 130, such that the treated aqueous mixture 124 may be passed from the reactor 120 to the separation device 130. The separation device 130 may be operable to separate precipitated solids 132 from the treated aqueous mixture 124 to produce a treated effluent 134. The separation device 130 may include a belt filter, a drum filter, a disk filter, or combinations of filters, such that the separation device 130 may be suitable for continuous filtering of the aqueous mixture 124. The precipitated solids 132 may include the sulfates and carbonates produced during the reaction in the reactor 120.

Once the treated aqueous mixture 124 has been passed to the separation device 130, the treated aqueous mixture 124 may be separated into precipitated solids 132 and a treated effluent 134. In embodiments, the precipitated solids 132 may include metal sulfate, metal carbonate, or both. The metal sulfate, the metal carbonate, or both may include barium, strontium, or both, depending on the metal chloride, the metal hydroxide, or both, originally introduced in the aqueous solution 116. For example, the metal sulfates may include barium sulfate, strontium sulfate, or both. The metal carbonates may include barium carbonate, strontium carbonate, or both. Once collected from the separation device 130, the metal sulfates, the metal carbonates, or both present in the precipitated solids 132 may be recrystallized, purified, and incorporated into a variety of operations, as the precipitated solids 132 are of substantially higher quality compared to mined metal sulfates and metal carbonates. The treated effluent 134 may include water and at least metal chloride, such as barium chloride, strontium chloride, or both. The treated effluent 134 may also include metal hydroxides, such as but not limited to barium hydroxide, strontium hydroxide, or both. The treated effluent 134 may include other soluble constituents, such as but not limited to ammonium chloride, ammonium hydroxide, or other soluble compounds.

With respect to separation, process for treating the sour water 122 may include separating the precipitated solids 132 from the treated aqueous mixture 124 to produce the treated effluent 134, which may include at least the metal chloride. If both metal chloride and metal hydroxide are present in the aqueous solution 116, then the treated effluent 134 may include at least metal chlorides and metal hydroxides upon separating the treated aqueous effluent 124. In embodiments, separating the treated aqueous mixture 124 may include filtering the treated aqueous mixture 124 to produce a solid product comprising the precipitated solids 132 and the treated effluent 134. Suitable filters for filtering the treated aqueous mixture may include any filter that allows for the continuous filtering of the treated aqueous mixture. Specific examples of suitable filters may include a belt filter, a drum filter, a disk filter, or combinations of these filters.

Referring again to FIG. 1, the sour water treatment system 100 may further include a vacuum crystallization system 140 disposed downstream from—and fluidly coupled to— the separation device 130. The vacuum crystallization system 140 may be operable to crystallize at least a portion of the metal chlorides in the treated effluent 134 to form a crystallization effluent 142 that may include solid metal chloride in an aqueous solution. If the treated effluent 134 additionally includes metal hydroxide, the crystallization effluent 142 may further include solid metal hydroxide. As such, the crystallized effluent 142 may include solid metal chloride, solid metal hydroxide, or both. The crystallized effluent 142 may further include ammonium chloride.

The vacuum crystallization system 140 may include a mixer 143 to improve heat transfer in the vacuum crystallization system 140. The vacuum crystallization system 140 may further include a heat transfer system 145 and a jacket 147. The heat transfer system 145 may be operable to maintain the crystallization temperature in the vacuum crystallization system 140. In embodiments, the heat transfer system 145 may operate to heat the treated effluent 134 to compensate for the latent heat of vaporization of water evaporated from the treated effluent 134. In embodiments, the vacuum crystallization system 140 may be suitable for performing a batch crystallization process, in which the vacuum crystallization system 140 is a mixed-suspension, mixed-product-removal (MSMPR) crystallizer. In embodiments, the vacuum crystallization system 140 may instead or additionally be suitable for performing a continuous crystallization process, in which the vacuum crystallization system 140 includes two or more MSMPR crystallizers in parallel, force circulation crystallizers, draft tube baffle crystallizers, or combinations of such crystallizers. The temperature of the vacuum crystallization system 140 may be from 20° C. to 95° C., such as from 30° C. to 95° C., from 40° C. to 90° C., from 50° C. to 80° C., from 60° C. to 70° C., or at 65° C. Likewise, the pressure of the vacuum crystallization system 140 may be from 2 kPa to 100 kPa, such as from 2 kPa to 85 kPa, from 5 kPa to 80 kPa, from 6 kPa to 75 kPa, from 7 kPa to 70 kPa, from 8 kPa to 65 kPa, from 9 kPa to 55 kPa, from 10 kPa to 50 kPa, from 20 kPa to 40 kPa, or 30 kPa. Without being bound by theory, it is believed that as the temperature of the vacuum crystallization system 140 changes, the pressure of the vacuum crystallization system 140 may be adjusted accordingly. For example, when the pressure of the vacuum crystallization system 140 is from 10 kPa to 50 kPa, the temperature may be from 50° C. to 80° C.

Water may be evaporated from the treated effluent 134 in the vacuum crystallization system 140 and may be passed out of the vacuum crystallization system 140 as a water vapor stream 148. The water vapor stream 148 may be passed to a condenser 150 that is downstream from—and fluidly coupled to—the vacuum crystallization system 140. The condenser 150 may be operable to condense the water vapor in the water vapor stream 148 to produce a purified water effluent 152. The amount of water removed from the vacuum crystallization system 140 in the water vapor stream 148 may be from 70 percent by volume (vol. %) to 99 vol. %, such as from 75 vol. % to 95 vol. %, from 80 vol. % to 90 vol. %, or 85 vol. %. At least a portion of the purified water effluent 152 may then be recycled back to the aqueous solution preparation system 170 for use in preparing the aqueous solution 116.

The process for treating the sour water 122 using the sour water treatment system 100 may include subjecting the treated effluent 134 to vacuum crystallization, where vacuum crystallization causes at least a portion of the metal chlorides in the treated effluent 134 to crystallize to form at least solid metal chloride. As previously discussed, the vacuum crystallization may include a batch crystallization process, which may include a mixed-suspension, mixed-product-removal (MSMPR) crystallizer. In one or more embodiments, the vacuum crystallization may instead or additionally include a continuous crystallization process, which may include a plurality of MSMPR crystallizers, force circulation crystallizers, draft tube baffle crystallizers, or combinations of such crystallizers. The vacuum crystallization process, in embodiments, may be performed at a temperature from 20° C. to 95° C., such as from 30° C. to 95° C., from 40° C. to 90° C., from 50° C. to 80° C., from 60° C. to 70° C., or at 65° C. Likewise, the vacuum crystallization process, in embodiments, may be performed at a pressure from 2 kPa to 100 kPa, such as from 2 kPa to 85 kPa, from 5 kPa to 80 kPa, from 6 kPa to 75 kPa, from 7 kPa to 70 kPa, from 8 kPa to 65 kPa, from 9 kPa to 55 kPa, from 10 kPa to 50 kPa, from 20 kPa to 40 kPa, or 30 kPa. Without being bound by theory, it is believed that as the temperature of the vacuum crystallization process changes, the pressure of the vacuum crystallization process changes may be adjusted accordingly. For example, when the pressure of the vacuum crystallization process changes is from 10 kPa to 50 kPa, a suitable temperature may be from 50° C. to 80° C.

Regardless of the vacuum crystallization process selection, the vacuum crystallization may further include recovering a water vapor effluent 148 from the vacuum crystallization. The recovering process may further include condensing the water vapor effluent 148 to produce a liquid water effluent 152. Condensing the water vapor effluent 148 may further include recycling the liquid water effluent 152 and the solid metal chloride into the aqueous solution 116, such that at least a portion of the aqueous solution includes the liquid water effluent and the solid metal chloride 162.

Referring again to FIG. 1, the sour water treatment system 100 may further include a second separation device 160 downstream from—and fluidly coupled to—the vacuum crystallization system 140. The second separation device 160 may be operable to separate the crystallization effluent 142 into a crystallized solid 166 and an ammonium chloride effluent 164. The crystallized solid 166 may include crystallized metal chloride, such as crystallized barium chloride, crystallized strontium chloride, or both. The crystallized solid 166 may further include crystallized metal hydroxide, such as crystallized barium hydroxide, crystallized strontium hydroxide, or both. The aqueous solution present in the vacuum crystallization system 140 may further include ammonium chloride 146, which may be sent to an additional vacuum crystallization system (not shown) to produce a solid ammonium chloride.

At least a portion of the ammonium chloride effluent 164 may be passed back (that is, recycled) to the vacuum crystallization system 140. In embodiments, from 1 vol. % to 20 vol. % of the ammonium chloride effluent 164 may be recycled back to the vacuum crystallization system 140, such as from 2 vol. % to 18 vol. %, from 3 vol. % to 17 vol. %, from 4 vol. % to 16 vol. %, from 5 vol. % to 15 vol. %, from 6 vol. % to 14 vol. %, from 7 vol. % to 13 vol. %, from 8 vol. %, to 12 vol. %, from 9 vol. % to 11 vol. %, or 10 vol. %. Alternatively or additionally, at least a portion of the ammonium chloride effluent 164 may be passed out of the system 100. The ammonium chloride effluent 164 passed out of the system may optionally be passed to an additional vacuum crystallization system (not shown) to produce the solid ammonium chloride.

The crystallized solid 166, the crystallized effluent 142, the ammonium chloride effluent 164, or combinations of these may be safe to incorporate into a variety of operations, as the products are substantially free from hydrogen sulfide, ammonium sulfide, phenol, and hydrogen cyanide. As used in the present disclosure, the term "substantially free" of a component means less than 10 ppmw of that component in a particular portion of stream or effluent. As a non-limiting example, the crystallized effluent 142 that is substantially free of hydrogen sulfide, ammonium sulfide, phenol, and hydrogen cyanide, may have less than 10 ppmw total of hydrogen sulfide, ammonium sulfide, phenol, and hydrogen cyanide based on the total weight of the crystallized effluent 142.

The sour water treatment system 100 may further include a recycle line 162 that may be fluidly coupled to the second separation device 160 or the vacuum crystallization system 140. The recycle line 162 may be operated to recycle at least a portion of the crystallized solid 166 back to the aqueous solution preparation system 170. In embodiments, from 50 vol. % to 100 vol. % of the crystallized solid 166 may be recycled back to the aqueous solution preparation system 170, such as from 55 vol. % to 99.99 vol. %, from 60 vol. % to 99.9 vol. %, from 65 vol. % to 99.5 vol. %, from 70 vol. % to 99 vol. %, from 75 vol. % to 98.5 vol. %, from 80 vol. % to 97.5 vol. %, from 85 vol. % to 95 vol. %, or greater than 90 vol. % of the crystallized solid 166 may be recycled back to the aqueous solution preparation system 170.

Once the aqueous solution preparation system 170 has received the liquid water effluent 152 from the condenser 150 and the crystallized solid 166 from the recycle line 162, additional make-up components, such as metal chloride 172, metal hydroxide 174, and water 176, may be included to produce the aqueous solution 116. As such, in embodiments, the liquid water effluent 152 and crystallized solid 166 may be recycled back into the aqueous solution 116, thereby decreasing the amount of make-up components needed during the electrolyzing step.

In embodiments, where the crystallized solid 162 includes barium chloride and barium hydroxide, the aqueous solution 116 may include from 50 percent by mole (mol. %) to 68 mol. % of the crystallized solid 162, which has been recycled to the aqueous solution 116 through the solution preparation system 170. Likewise, where the crystallized solid 162 includes strontium chloride and strontium hydroxide, the aqueous solution 116 may include from 32 mol. % to 50 mol. % of the crystallized solid 162, which has been recycled to the aqueous solution 116 through the solution preparation system 170.

In a first aspect of the present disclosure, a process for treating sour water may include electrolyzing an aqueous solution comprising metal chloride, where electrolyzing the aqueous solution causes at least a portion of the metal chloride to undergo chemical reaction to produce a treatment composition comprising hypochlorite. The process may further include contacting at least a portion of the treatment composition with the sour water at a pH from 8 to 12, where the sour water comprises sulfides and the contacting causes reaction of the sulfides in the sour water with the hypochlorite to produce a treated aqueous mixture comprising at least metal sulfates and metal chlorides, where the metal sulfates are present in the treated aqueous mixture as precipitated solids. The process may further include separating the precipitated solids from the treated aqueous mixture to produce a treated effluent comprising at least the metal chloride.

A second aspect of the present disclosure may include the first aspect, in which the aqueous solution is prepared by contacting the metal chloride with the anode, such that the contacting causes at least a portion of ions present in the metal chloride to react to form hypochlorite and contacting water with the cathode, such that the contacting causes at least a portion of the water to react to form hydrogen.

A third aspect of the present disclosure may include the first aspect or the second aspect, in which the aqueous solution further comprises metal hydroxide.

A fourth aspect of the present disclosure may include the third aspect, in which a metal of the metal chloride, the metal hydroxide, or both comprises strontium, barium, or both.

A fifth aspect of the present disclosure may include the fourth aspect, in which the metal sulfates in the treated aqueous mixture comprise strontium sulfate, barium sulfate, or both.

A sixth aspect of the present disclosure may include any of the first through fifth aspects, in which separating the treated aqueous mixture comprises filtering the treated aqueous mixture to produce a solid product comprising the precipitated solids and the treated effluent.

A seventh aspect of the present disclosure may include any of the first through sixth aspects, in which the sour water comprises hydrogen cyanide and contacting the at least a portion of the treatment composition with the sour water causes reactions between the hydrogen cyanide, the hypochlorite, and water to produce at least metal chlorides, nitrogen gas, and metal carbonates, where at least a portion of the metal carbonates are present in the treated aqueous mixture as a portion of the precipitated solids.

An eighth aspect of the present disclosure may include any of the first through seventh aspects, in which the sour water comprises phenolic compounds and contacting the at least a portion of the treatment composition with the sour water causes reactions between the phenolic compounds and the hypochlorite to produce at least metal chlorides, metal carbonates, and water, where at least a portion of the metal carbonates are present in the treated aqueous effluent as a portion of the precipitated solids.

A ninth aspect of the present disclosure may include any of the first through eighth aspects, further comprising subjecting the treated effluent to vacuum crystallization, where vacuum crystallization causes at least a portion of the metal chlorides in the treated effluent to crystallize to form solid metal chloride and at least a portion of metal hydroxides in the treated effluent to form solid metal hydroxide.

A tenth aspect of the present disclosure may include the ninth aspect, in which subjecting the treated effluent to vacuum crystallization comprises recovering a water vapor effluent from the vacuum crystallization.

An eleventh aspect of the present disclosure may include the tenth aspect, further comprising condensing the water vapor effluent to produce a liquid water effluent.

A twelfth aspect of the present disclosure may include the eleventh aspect, further comprising recycling the liquid water effluent, the solid metal chloride, and the solid metal hydroxide into the aqueous solution such that at least a portion of the aqueous solution comprises the liquid water effluent, the solid metal chloride, and the solid metal hydroxide.

A thirteenth aspect of the present disclosure may include any of the first through twelfth aspects, in which the aqueous solution comprises from 15 percent by weight (wt. %) to 30 wt. % of the metal chloride.

A fourteenth aspect of the present disclosure may include any of the first through thirteenth aspects, in which the sour water comprises from 100 parts per million by weight (ppmw) to 100,000 ppmw of hydrogen sulfide, from 100 ppmw to 100,000 ppmw of ammonium sulfide, from 50 ppmw to 500 ppmw of phenolic compounds, and from 300 ppmw to 500 ppmw of hydrogen cyanide.

A fifteenth aspect of the present disclosure may include the fourteenth aspect, in which the treated aqueous mixture comprises less than 10 ppmw of hydrogen sulfide, less than 10 ppmw of ammonium sulfide, less than 0.05 ppmw of phenolic compounds, and less than 0.05 ppmw of hydrogen cyanide.

A sixteenth aspect of the present disclosure may include any of the first through fifteenth aspects, in which the contacting step is performed at a temperature from 15 degrees Celsius (° C.) to 45° C.

A seventeenth aspect of the present disclosure may include any of the first through sixteenth aspects, in which the contacting step is performed at a pressure from 50 kilopascals (kPa) to 200 kPa.

In an eighteenth aspect of the present disclosure, a process for treating sour water may include passing an electric current through an aqueous solution in an electrolyzer to produce a treatment composition, where the aqueous solution comprises metal chloride and metal hydroxide and passing the electric current through the aqueous solution causes at least a portion of ions present in the metal chloride to react to form hypochlorite. The process may further include passing the sour water and at least a portion of the treatment composition comprising the hypochlorite to a reaction zone. The process may further include contacting the at least a portion of the treatment composition with the sour water in the reaction zone, where the sour water comprises sulfides and the contacting causes reaction of at least a portion of the sulfides in the sour water with the hypochlorite to produce a treated aqueous mixture comprising at least metal sulfates and metal chlorides, where the metal sulfates are present in the treated aqueous mixture as precipitated solids. The process may further include passing the treated aqueous mixture to a separation device. The process may further include separating the treated aqueous effluent into at least a solid stream comprising the precipitated solids and a treated effluent comprised of at least metal chlorides and metal hydroxides.

A nineteenth aspect of the present disclosure may include the eighteenth aspect, in which a metal of the metal chloride, metal hydroxide, or both comprises strontium, barium, or both.

A twentieth aspect of the present disclosure may include the nineteenth aspect, in which a metal of the metal sulfates in the treated aqueous mixture comprises strontium sulfate, barium sulfate, or both.

A twenty-first aspect of the present disclosure may include any of the eighteenth through twentieth aspects, in which separating the treated aqueous mixture comprises filtering the treated aqueous mixture to produce a solid product comprising the precipitated solids and the treated effluent.

A twenty-second aspect of the present disclosure may include the twenty-first aspect, in which the filtering is performed with a belt filter, a drum filter, a disk filter, or combinations of such filters.

A twenty-third aspect of the present disclosure may include any of the eighteenth through twenty-second aspects, in which the sour water comprises hydrogen cyanide and contacting the at least a portion of a treatment composition comprising the hypochlorite with the sour water causes reactions between the hydrogen cyanide, the hypochlorite, the metal hydroxide, and water to produce at least metal chlorides, nitrogen gas, and metal carbonates, where at least a portion of the metal carbonates are present in the treated aqueous mixture as at least a portion of the precipitated solids.

A twenty-fourth aspect of the present disclosure may include any of the eighteenth through twenty-third aspects, in which the sour water comprises phenolic compounds and contacting the at least a portion of a treatment composition comprising the hypochlorite with the sour water causes reactions between the phenolic compounds and the hypochlorite to produce at least metal chlorides, metal carbonates, and water, where at least a portion of the metal carbonates are present in the treated aqueous effluent as at least a portion of the precipitated solids.

A twenty-fifth aspect of the present disclosure may include any of the eighteenth through twenty-fourth aspects, further comprising subjecting the treated effluent to vacuum crystallization, where vacuum crystallization causes at least a portion of the metal chlorides in the treated effluent to crystallize to form solid metal chloride and at least a portion of metal hydroxides in the treated effluent to form solid metal hydroxide.

A twenty-sixth aspect of the present disclosure may include the twenty-fifth aspect, in which subjecting the treated effluent to vacuum crystallization comprises recovering water vapor as a vapor stream.

A twenty-seventh aspect of the present disclosure may include the twenty-sixth aspect, in which recovering water vapor as a vapor stream comprises condensing the water vapor to produce a liquid water effluent.

A twenty-eighth aspect of the present disclosure may include the twenty-seventh aspect, further comprising recycling the liquid water effluent, the solid metal chloride, and the solid metal hydroxide into the aqueous solution such that at least a portion of the aqueous solution comprises the liquid water effluent, the solid metal chloride, and the solid metal hydroxide.

A twenty-ninth aspect of the present disclosure may include any of the twenty-fifth through twenty-eighth aspects, in which subjecting the treated effluent to vacuum crystallization is a batch crystallization process comprising a mixed-suspension, mixed-product-removal (MSMPR) crystallizer.

A thirtieth aspect of the present disclosure may include any of the twenty-fifth through twenty-eighth aspects, in which subjecting the treated effluent to vacuum crystallization is a continuous crystallization process comprising a plurality of MSMPR crystallizers, force circulation crystallizers, draft tube baffle crystallizers, or combinations of such reactors.

A thirty-first aspect of the present disclosure may include any of the twenty-fifth through thirtieth aspects, in which subjecting the treated effluent to vacuum crystallization is performed at a temperature from 20° C. to 95° C.

A thirty-second aspect of the present disclosure may include any of the twenty-fifth through thirty-first aspects, in which subjecting the treated effluent to vacuum crystallization is performed at a pressure from 2 kPa to 85 kPa.

A thirty-third aspect of the present disclosure may include any of the eighteenth through thirty-second aspects, further comprising preparing the aqueous solution in an aqueous solution preparation system.

A thirty-fourth aspect of the present disclosure may include any of the eighteenth through thirty-third aspects, further comprising passing the solid metal chloride and solid metal hydroxide from a vacuum crystallization system back to the aqueous solution preparation system.

A thirty-fifth aspect of the present disclosure may include any of the eighteenth through thirty-fourth aspects, in which the aqueous solution comprises from 15 percent by weight (wt. %) to 30 wt. % of the metal chloride and from 1 wt. % to 10 wt. % of the metal hydroxide.

A thirty-sixth aspect of the present disclosure may include any of the eighteenth through thirty-fifth aspects, in which the sour water comprises from 100 parts per million by weight (ppmw) to 100,000 ppmw of hydrogen sulfide, from 100 ppmw to 100,000 ppmw of ammonium sulfide, from 50 ppmw to 500 ppmw of phenolic compounds, and from 300 ppmw to 500 ppmw of hydrogen cyanide.

A thirty-seventh aspect of the present disclosure may include the thirty-sixth aspect, in which the treated aqueous mixture comprises less than 10 ppmw of hydrogen sulfide, less than 10 ppmw of ammonium sulfide, less than 0.05 ppmw of phenolic compounds, and less than 0.05 ppmw of hydrogen cyanide.

A thirty-eighth aspect of the present disclosure may include any of the eighteenth through thirty-seventh aspects, in which the contacting step is performed at a temperature from 15° C. to 45° C.

A thirty-ninth aspect of the present disclosure may include any of the eighteenth through thirty-eighth aspects, in which the contacting step is performed at a pressure from 50 kPa to 200 kPa.

A fortieth aspect of the present disclosure may include any of the eighteenth through thirty-ninth aspects, in which the contacting step is performed at a pH from 8 to 12.

A forty-first aspect of the present disclosure may include any of the eighteenth through fortieth aspects, in which the sour water has a flow rate from 1 cubic meters per hour ($m^3$/hr) to 50 $m^3$/hr.

A forty-second aspect of the present disclosure may include the forty-first aspect, in which a volumetric ratio of the treatment composition to the sour water during contacting is from 0.5 to 1.8.

A forty-third aspect of the present disclosure may include any of the eighteenth through forty-second aspects, in which the electrolyzer comprises a vessel, at least one anode, and at least one cathode.

A forty-fourth aspect of the present disclosure may include any of the eighteenth through forty-third aspects, in which the aqueous solution is prepared by contacting the metal chloride with the anode, such that the contacting causes at least a portion of the ions present in the metal chloride to react to form hypochlorite and contacting water with the cathode, such that the contacting causes at least a portion of the water to react to form hydrogen.

In a forty-fifth aspect of the present disclosure, a system for treating sour water may include an electrolyzer comprising at least one anode, at least one cathode, and a power source electrically coupled to the at least one anode and the at least one cathode, the electrolyzer operable to pass an electric current through an aqueous solution comprising metal chloride to produce a treatment composition comprising hypochlorite. The system may further include a reactor downstream from the electrolyzer, where the reactor is operable to contact at least a portion of the treatment composition comprising the hypochlorite with sour water at a pH from 8 to 12. The system may further include a separation device downstream from the reactor, where the separation device is operable to separate precipitated solids from the treated aqueous mixture to produce a solid product comprising metal sulfates and metal carbonates and a treated effluent comprising the metal chloride.

A forty-sixth aspect of the present disclosure may include the forty-fifth aspect, where the aqueous solution and the treated effluent further comprises metal hydroxide.

A forty-seventh aspect of the present disclosure may include the forty-sixth aspect, further comprising a vacuum crystallization system downstream from the separation device, the vacuum crystallization system being operable to crystallize at least a portion of the metal chlorides and metal hydroxides in the treated effluent to form a crystallized product in an aqueous solution.

A forty-eighth aspect of the present disclosure may include the forty-seventh aspect, further comprising a second separation device downstream from the vacuum crystallization system, in which the second separation device is operable to separate the metal chloride and the metal hydroxide from the crystallization effluent to produce a crystallized solid and an ammonium chloride solution.

A forty-ninth aspect of the present disclosure may include the forty-eighth aspect, further comprising an aqueous solution preparation system upstream of the electrolyzer, the aqueous solution preparation system operable to contact the crystallized solid with water to form the aqueous solution.

A fiftieth aspect of the present disclosure may include the forty-ninth aspect, further comprising a recycle line fluidly coupled to the second separation device or the vacuum crystallization system and to the aqueous solution preparation system, the recycle line operable to recycle the crystallized solid back to the aqueous solution preparation system.

It should be apparent to those skilled in the art that various modifications and variations can be made to the described embodiments without departing from the spirit and scope of the claimed subject matter. Thus, it is intended that the specification cover the modifications and variations of the various described embodiments provided such modifications and variations come within the scope of the appended claims and their equivalents.

It is noted that one or more of the following claims utilize the term "where" as a transitional phrase. For the purposes of defining the present disclosure, it is noted that this term is introduced in the claims as an open-ended transitional phrase that is used to introduce a recitation of a series of characteristics of the structure and should be interpreted in like manner as the more commonly used open-ended preamble term "comprising." For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter.

It should be understood that any two quantitative values assigned to a property may constitute a range of that property, and all combinations of ranges formed from all stated quantitative values of a given property are contemplated in this disclosure.

Having described the subject matter of the present disclosure in detail and by reference to specific embodiments, it is noted that the various details described in this disclosure should not be taken to imply that these details relate to elements that are essential components of the various embodiments described in this disclosure, even in cases where a particular element is illustrated in each of the drawings that accompany the present description. Rather, the appended claims should be taken as the sole representation of the breadth of the present disclosure and the corresponding scope of the various embodiments described in this disclosure. Further, it will be apparent that modifications and variations are possible without departing from the scope of the appended claims.

What is claimed is:

1. A process for treating sour water, the process comprising:
    combining water, metal chloride, and metal hydroxide to produce an aqueous solution, where a metal of the metal chloride and a metal of the metal hydroxide comprises strontium, barium, or both, where the aqueous solution comprises from 15 percent by weight (wt. %) to 30 wt. % of the metal chloride and 1 wt. % to 10 wt. % the metal hydroxide;
    after the combining, electrolyzing the aqueous solution, where electrolyzing the aqueous solution causes at least a portion of the metal chloride to undergo chemical reaction to produce a treatment composition comprising hypochlorite;
    contacting at least a portion of the treatment composition with the sour water at a pH from 8 to 12, where the sour water comprises sulfides and the contacting causes reaction of the sulfides in the sour water with the hypochlorite to produce a treated aqueous mixture comprising at least metal sulfates and metal chlorides, where the metal sulfates are present in the treated aqueous mixture as precipitated solids; and
    separating the precipitated solids from the treated aqueous mixture to produce a treated effluent comprising at least the metal chlorides.

2. The process of claim 1, where electrolyzing the aqueous solution comprises contacting the aqueous solution with an anode and a cathode and passing an electric current through the aqueous solution, where:
    contacting the metal chloride with the anode causes at least a portion of ions present in the metal chloride to react to form hypochlorite; and
    contacting water with the cathode causes at least a portion of the water to react to form hydrogen.

3. The process of claim 1, in which the metal sulfates in the treated aqueous mixture comprise strontium sulfate, barium sulfate, or both.

4. The process of claim 1, in which separating the treated aqueous mixture comprises filtering the treated aqueous mixture to produce a solid product comprising the precipitated solids and the treated effluent.

5. The process of claim 1, in which the sour water comprises hydrogen cyanide and contacting the at least a portion of the treatment composition with the sour water causes reactions between the hydrogen cyanide, the hypochlorite, and water to produce at least metal chlorides, nitrogen gas, and metal carbonates, where at least a portion of the metal carbonates are present in the treated aqueous mixture as a portion of the precipitated solids.

6. The process of claim 1, in which the sour water comprises phenolic compounds and contacting the at least a portion of the treatment composition with the sour water causes reactions between the phenolic compounds and the hypochlorite to produce at least metal chlorides, metal carbonates, and water, where at least a portion of the metal carbonates are present in the treated aqueous effluent as a portion of the precipitated solids.

7. The process of claim 1, further comprising subjecting the treated effluent to vacuum crystallization, where:
   the treated effluent further comprises metal hydroxides; and
   vacuum crystallization causes at least a portion of the metal chlorides in the treated effluent to crystallize to form solid metal chloride and at least a portion of metal hydroxides in the treated effluent to form solid metal hydroxide.

8. The process of claim 7, in which subjecting the treated effluent to vacuum crystallization comprises recovering a water vapor effluent from the vacuum crystallization.

9. The process of claim 8, further comprising:
   condensing the water vapor effluent to produce a liquid water effluent; and
   recycling the liquid water effluent, the solid metal chloride, and the solid metal hydroxide into the aqueous solution such that at least a portion of the aqueous solution comprises the liquid water effluent, the solid metal chloride, and the solid metal hydroxide.

10. The process of claim 1, in which:
    the sour water comprises from 100 parts per million by weight (ppmw) to 100,000 ppmw of hydrogen sulfide, from 100 ppmw to 100,000 ppmw of ammonium sulfide, from 50 ppmw to 500 ppmw of phenolic compounds, and from 300 ppmw to 500 ppmw of hydrogen cyanide; and
    the treated aqueous mixture comprises less than 10 ppmw of hydrogen sulfide, less than 10 ppmw of ammonium sulfide, less than 0.05 ppmw of phenolic compounds, and less than 0.05 ppmw of hydrogen cyanide.

11. The process of claim 1, in which the contacting step is performed at a temperature from 15 degrees Celsius (° C.) to 45° C. and at a pressure from 50 kilopascals (kPa) to 200 kPa.

12. The process of claim 1, where a volumetric ratio of the treatment composition to the sour water during contacting is from 0.5 to 1.8.

13. A process for treating sour water, the process comprising:
    combining water, metal chloride, and metal hydroxide to produce an aqueous solution, where a metal of the metal chloride, the metal hydroxide, or both comprises strontium, barium, or both;
    electrolyzing the aqueous solution, where electrolyzing the aqueous solution causes at least a portion of the metal chloride to undergo chemical reaction to produce a treatment composition comprising hypochlorite;
    contacting at least a portion of the treatment composition with the sour water at a pH from 8 to 12, where the sour water comprises sulfides and the contacting causes reaction of the sulfides in the sour water with the hypochlorite to produce a treated aqueous mixture comprising at least metal sulfates and metal chlorides, where the metal sulfates are present in the treated aqueous mixture as precipitated solids; and
    separating the precipitated solids from the treated aqueous mixture to produce a treated effluent comprising at least the metal chloride;
    recovering solid metal chlorides from the treated effluent; and
    recycling the solid metal chlorides recovered from the treated effluent into the aqueous solution such that at least a portion of the aqueous solution comprises the solid metal chlorides.

14. The process of claim 13, wherein the treated effluent comprises metal hydroxides and the process further comprises:
    recovering solid metal hydroxides from the treated effluent; and
    recycling the solid metal hydroxides recovered from the treated effluent into the aqueous solution such that at least a portion of the aqueous solution comprises the solid metal hydroxides.

15. The process of claim 13, further comprising:
    evaporating water from the treated effluent to produce a water vapor steam;
    condensing water vapor in the water vapor steam to produce a liquid water effluent;
    recycling the liquid water effluent into the aqueous solution such that at least a portion of the aqueous solution comprises the liquid water effluent.

16. The process of claim 13, recovering solid metal chlorides from the treated effluent comprises subjecting the treated effluent to vacuum crystallization, where:
    the treated effluent further comprises metal hydroxides; and
    vacuum crystallization causes at least a portion of the metal chlorides in the treated effluent to crystallize to form solid metal chloride and at least a portion of metal hydroxides in the treated effluent to form solid metal hydroxide.

17. The process of claim 16, where subjecting the treated effluent to vacuum crystallization comprises recovering a water vapor effluent from the vacuum crystallization.

18. The process of claim 17, further comprising:
    condensing the water vapor effluent to produce a liquid water effluent; and
    recycling the liquid water effluent, the solid metal chloride, and the solid metal hydroxide into the aqueous solution such that at least a portion of the aqueous solution comprises the liquid water effluent, the solid metal chloride, and the solid metal hydroxide.

* * * * *